(12) United States Patent
Liang et al.

(10) Patent No.: US 12,534,783 B2
(45) Date of Patent: Jan. 27, 2026

(54) BIODEGRADABLE MAGNESIUM ALLOY WITHOUT RARE EARTH ELEMENTS, PREPARATION METHOD AND USE THEREOF

(71) Applicants: Shanghai INT Medical Instruments Co., Ltd., Shanghai (CN); Shanghai PuMei Medical Instruments CO., Ltd., Jiangqiao Town (CN)

(72) Inventors: Dongke Liang, Shanghai (CN); Zheng Zhao, Shanghai (CN); Lei Shang, Shanghai (CN); Tao Li, Shanghai (CN); Sen Lin, Shanghai (CN)

(73) Assignees: Shanghai INT Medical Instruments Co., Ltd., Shanghai (CN); Shanghai PuMei Medical Instruments Co., Ltd., Jiangqiao Town (CN)

( * ) Notice: Subject to any disclaimer, the term of this patent is extended or adjusted under 35 U.S.C. 154(b) by 300 days.

(21) Appl. No.: 18/246,445

(22) PCT Filed: Nov. 30, 2022

(86) PCT No.: PCT/CN2022/135496
§ 371 (c)(1),
(2) Date: Mar. 23, 2023

(87) PCT Pub. No.: WO2023/165194
PCT Pub. Date: Sep. 7, 2023

(65) Prior Publication Data
US 2024/0352560 A1      Oct. 24, 2024

(30) Foreign Application Priority Data
Mar. 3, 2022      (CN) .......................... 202210204770.2

(51) Int. Cl.
*C22C 23/04*      (2006.01)
*A61L 27/04*      (2006.01)
(Continued)

(52) U.S. Cl.
CPC ............ *C22C 23/04* (2013.01); *A61L 27/047* (2013.01); *A61L 27/58* (2013.01); *A61L 31/022* (2013.01);
(Continued)

(58) Field of Classification Search
CPC ........... C22C 23/04; C22C 1/02; C22C 23/00; A61L 27/047; A61L 27/58; A61L 31/022;
(Continued)

(56) References Cited

U.S. PATENT DOCUMENTS

| | | | | |
|---|---|---|---|---|
| 2014/0261911 | A1* | 9/2014 | Imwinkelried | ........... C22F 1/06 148/557 |
| 2015/0129091 | A1 | 5/2015 | Mueller et al. | |
| 2019/0112693 | A1* | 4/2019 | Lee | ......................... C22C 23/04 |

FOREIGN PATENT DOCUMENTS

| | | |
|---|---|---|
| CN | 101392344 A | 3/2009 |
| CN | 101768689 A | 7/2010 |

(Continued)

OTHER PUBLICATIONS

KR-20030044997-A, machine translation (Year: 2003).*
(Continued)

*Primary Examiner* — John A Hevey
(74) *Attorney, Agent, or Firm* — DINSMORE & SHOHL LLP

(57) ABSTRACT

The present application provides a biodegradable magnesium alloy without rare earth elements. The magnesium alloy comprises the following elements in percentage by mass: Zn 1.0-5.0%; Mn 0.1-1.0%; Ca 0.1-1.0%; Sr 0.1-1.0%; Sn 0.1-3.0%; Zr 0.1-0.8%; and Mg balance. The
(Continued)

impurity in the magnesium alloy does not contain rare earth elements. The present application also provides a method for preparing the above biodegradable magnesium alloy and use in the preparation of medical devices. In the present application, Mg is used as the main components and mixed with a specific proportion of Zn, Ca and Mn to prepare the alloy. The biodegradable magnesium alloy of the present application has a controllable degradation rate and strong mechanical strength, and there are no harmful elements to a human body, and the degradation of the alloy in the human body will not affect human body.

5 Claims, 3 Drawing Sheets

(51) Int. Cl.
  *A61L 27/58* (2006.01)
  *A61L 31/02* (2006.01)
  *A61L 31/14* (2006.01)
  *B21C 23/00* (2006.01)
  *B22D 1/00* (2006.01)
  *B22D 21/00* (2006.01)
  *C22C 1/02* (2006.01)
  *C22F 1/06* (2006.01)

(52) U.S. Cl.
  CPC .......... *A61L 31/148* (2013.01); *B21C 23/002* (2013.01); *B22D 1/002* (2013.01); *B22D 21/007* (2013.01); *C22C 1/02* (2013.01); *C22F 1/06* (2013.01)

(58) Field of Classification Search
  CPC ..... A61L 31/148; B21C 23/002; B21C 37/00; B22D 1/002; B22D 21/007; C22F 1/06
  See application file for complete search history.

(56) References Cited

FOREIGN PATENT DOCUMENTS

| CN | 102296220 A | | 12/2011 |
|---|---|---|---|
| CN | 103526091 A | | 1/2014 |
| CN | 103614601 A | | 3/2014 |
| CN | 104328318 A | | 2/2015 |
| CN | 106811706 A | | 6/2017 |
| CN | 107304466 A | | 10/2017 |
| CN | 109680195 A | | 4/2019 |
| CN | 109972007 A | * | 7/2019 |
| CN | 112695237 A | | 4/2021 |
| CN | 112760537 A | | 5/2021 |
| CN | 114561579 A | | 5/2022 |
| KR | 20030044997 A | * | 6/2003 |
| KR | 20100106137 A | | 10/2010 |

OTHER PUBLICATIONS

CN-109972007-A, machine translation (Year: 2019).*
AA. Malik, Y.Wang, F. Nazeer et al., Deformation behavior of MgeZneZr magnesium alloy on the basis of macro-Texture and fine-grain size under tension and compression loading along various directions, Journal of Alloys and Compounds, https://doi.org/10.1016/j.jallcom.2020.157740.
Written Opinion of the International Searching Authority dated Feb. 15, 2023.
International Search Report of International application No. PCT/CN2022/135496.

* cited by examiner

BIODEGRADABLE MAGNESIUM ALLOY WITHOUT RARE EARTH ELEMENTS, PREPARATION METHOD AND USE THEREOF

CROSS REFERENCE TO RELATED APPLICATIONS

This application is a National Stage of International Application No. PCT/CN2022/135496, filed Nov. 30, 2022, which in turn claims the benefit of Chinese Patent Application No. 202210204770.2, Mar. 3, 2022. The entire disclosures of the above applications are incorporated herein by reference.

TECHNICAL FIELD

The present application relates to the field of medical materials, in particular to a biodegradable magnesium alloy without rare earth elements, a preparation method and use thereof.

BACKGROUND

Medical metal materials are biomaterials that have developed rapidly in recent years. Due to their excellent mechanical properties, they are more suitable for implant materials in load-bearing parts than non-metal materials. Nowadays, commonly used medical metal materials comprise stainless steel, titanium and titanium alloys, cobalt-chromium alloys, precious metals, magnesium alloys, etc.

Magnesium alloy has become a widely used medical metal material due to its low density, high strength, and easy machining and welding characteristics. The magnesium in the human body undergoes a chemical reaction in the solution medium and turns into magnesium ion, and the magnesium ion regulates the balance through absorption in the body and metabolism in the kidney, so that the magnesium alloy material is gradually degraded and absorbed in the body. Magnesium alloys have become the first choice for human body stent or support and load-bearing materials due to its excellent mechanical properties, controllable corrosion resistance and minimal side effects of degradation products. However, magnesium is relatively active, and it is easily corroded in the human body, that is, the degradation rate is too fast. This was once a shortcoming of magnesium alloys used in the human body. However, unlike other metal materials, magnesium itself is an important element necessary for human body, and magnesium alloy can be used as a material that absorbs and degrades in the human body. In the prior art, many scholars and researchers have conducted research on magnesium alloys applied in the human body.

CN112760537A discloses a magnesium alloy comprising 88-93 parts of Mg, 2-6 parts of Zn, 0.2-1 part of Ca, 0.3-1 part of Mn, 0.3-1 part of Sn and 0.7-5 parts of rare earth metals. This application also discloses a method for preparing the above magnesium alloy and its use in the preparation of medical devices. In the application, Mg as the main components is mixed with Zn, Ca, Mn, Sn and rare earth metals in specific proportion to prepare the alloy, which has a controllable degradation rate and strong mechanical strength.

CN102296220A relates to a biomedical anti-corrosion magnesium alloy which can be used as a human body implantation material, which comprise the following components in percentage by mass: Zn: 1.5%-2.5%, Mn: 0.8-1.4%, Nd: 0.5-1.5%, Ca: 0.5-1.0%, balance: Mg and unavoidable impurities. The preparation method is as follows: the raw materials are weighed according to the ratio and put into a graphite crucible to melt the alloy in the vacuum electric induction furnace with high purity argon as the protective gas. The electromagnetic stirring device is started when the melting temperature reaches 770° C., stirred for 10-20 min and the crucible is tilted several times during the period of stirring. Then it is refined with $C_2Cl_6$ refining agent for 3-5 min. The melt is stirred and poured into the mold when it is cooled to 700-720° C. to form alloy ingots. The magnesium alloy provided in this application not only has good mechanical properties, especially has excellent corrosion resistance, which can effectively solve the problem of too fast corrosion and degradation rate of biomedical magnesium alloy in body fluids, but also has good biocompatibility, and the degradation products have no toxic effect on human body, so it is expected to be widely used in the field of biomedicine.

CN109972007A relates to a biodegradable magnesium alloy anastomotic nail material and preparation method thereof. The magnesium alloy is composed of Mg—Zn—Ca-M, wherein M is one or any combination of Ag, Mn, Sn, Sr, Zr and Ge elements. The target alloy is obtained by melting casting, homogenization treatment, hot extrusion or drawing at room temperature and annealing treatment. Compared with the prior art, the magnesium alloy material prepared by the composition and preparation method described in this application has higher strength and plasticity and a controllable degradation rate, and can be degraded naturally in the living body. The degradation products not only have no toxic side effects, but also can provide necessary nutritional supplements, which has higher biosafety. It is suitable for the staple material used in the suturing or anastomosis of the oral cavity, gastrointestinal tract and other organs, so as to avoid the secondary operations and reduce the pain for patients. The trace silver element released in it can also inhibit the occurrence of bacterial inflammation around the implant.

It is shown in the prior art that magnesium alloys added with rare earth elements have improved strength, but rare earth elements (especially after degradation) can cause a series of adverse reactions such as liver toxicity. Although there are a lot of studies on non-rare earth doping elements for magnesium alloys used in biological orthopedic implants in prior art. However, as biodegradable magnesium alloys, there are still some unsolved problems in the prior art, such as the degradation rate of magnesium alloy in the body, the excessive corrosion rate (especially the rapid pitting corrosion expansion), the adjustment of the degradation effect, and how to compensate for the strength loss caused by the lack of rare earth elements, which affect the use effect of medical magnesium alloys. Therefore, it is urgent to develop a magnesium alloy which can not only ensure the strength but also control the degradation effect and corrosion.

SUMMARY OF THE INVENTION

In order to solve the problems of uncontrollable degradation rate of the existing biodegradable magnesium alloy and the degradation and corrosion too fast, which will lead to biotoxicity, as well as the strength and corrosion resistance will be reduced without the addition of rare earth elements, the present application provides a biodegradable magnesium alloy without rare earth elements.

The inventors of the present application have found that although the biological incompatibility and cytotoxicity caused by rare earth elements can be alleviated without the addition of rare earth elements into magnesium alloy orthopedic implant materials, the degradable magnesium alloys without rare earth elements in the prior art still have problems such as low strength, serious pitting or pit corrosion and rapid deterioration, which cannot be resolved. The crucial factor affecting the strength and corrosion properties of magnesium alloys is the internal structure of magnesium alloys. Generally speaking, refined grain can improve the strength of magnesium alloy. Corrosion, especially the formation of pitting corrosion, is generally caused by the anode and cathode effect on the metal surface: When the surface layer (usually oxide layer) of the alloy is destroyed, a cathode is formed, while the exposed internal intrinsic magnesium alloy forms an "anode". The interaction between the anode will continue to accumulate after the formation of the electrode effect, forming deeper and deeper corrosion pits, and such pits will continue to diffuse and accumulate, and eventually will cause great damage to the strength and corrosion resistance of the magnesium alloys. In the prior art, the molten magnesium alloy is processed, such as extrusion and other shaping deformation, hoping to achieve the effect of structure reconstruction. However, the performance improvement of the workpiece obtained by processing the current casting alloy is limited.

To solve the above-mentioned problems, the means adopted by the inventor comprise: performing an accurate and controllable post-processing procedure on the cast magnesium alloy. Optional post-processing comprises process-controlled heat treatment, rolling and hot extrusion. During the heat treatment process, the diffusion effect is used to eliminate or reduce the inhomogeneous inclusion precipitates appearing in the magnesium alloy structure during casting and solidification, and reduce the obstruction of grain refinement or recrystallization in the subsequent processing process; the first refinement of the internal structure of the magnesium alloy then is achieved by using the regulated hot extrusion process, and the cracks in the alloy surface layer are repaired and became denser during extrusion; the second refinement of magnesium alloy grains is achieved by the subsequent controlled rolling process. This precise control of the morphology of the magnesium alloy is essential for the property control of the final product.

Specifically, the first aspect of the present application provides the following biodegradable magnesium alloy without rare earth elements, the magnesium alloy comprises the following elements in percentage by mass:

| | |
|---|---|
| Zn | 1.0-5.0%; |
| Mn | 0.1-1.0%; |
| Ca | 0.1-1.0%; |
| Sr | 0.1-1.0%; |
| Sn | 0.1-3.0%; |
| Zr | 0.1-0.8%; |
| Mg | balance; | wherein, the magnesium alloy has an average grain size of 5-10 μm, and an average density of microcrack distribution on the surface of the magnesium alloy is less than or equal to 20 microcracks/mm².

In an optional embodiment, the magnesium alloy comprises 1.0-3.0% of Zn, 0.5-1.0% of Ca, 0.5-1.0% of Mn and 0.3-0.5% of Zr.

In an optional embodiment, a mass ratio of an impurity in the magnesium alloy is 0.003 wt % or less.

In an optional embodiment, the impurity in the magnesium alloy does not contain aluminum.

The second aspect of the present application provides a method for preparing the above-mentioned biodegradable magnesium alloy, specifically comprising the steps of:
1) melting-casting: in a closed container, fully adding each metal powder into a melting ladle according to the required proportion, controlling the temperature to melt at 700-800° C., blowing argon and stirring, casting and cooling;
2) heat treatment: heating the alloy obtained by casting, controlling the temperature at 200-250° C., annealing for 1-5 min, and cooling;
3) hot extrusion: putting the heat-treated alloy into a hot extrusion mold, controlling the temperature at 250-300° C., controlling the extrusion rate at 2-5 mm/s, and setting the extrusion ratio to 10-15:1; and
4) rolling and forming: rolling at a temperature of 320-350° C., controlling the speed at 20-30 m/min, and controlling the reduction of each rolling at 50-80%, to obtain a formed degradable magnesium alloy.

In an optional embodiment, after the rolling is completed, a further heat treatment process can be carried out according to requirements.

In an optional embodiment, preheating is carried out before rolling, and the preheating time does not exceed 10 minutes.

In an optional embodiment, the passes for the rolling are no more than 10 times. In an optional embodiment, during the melting-casting, the blowing argon and stirring is blowing argon gas through a gas port at the bottom of the melting ladle.

The third aspect of the present application provides use of the above-mentioned biodegradable magnesium alloy without rare earth elements in medical devices. The biodegradable magnesium alloy is further processed into forms of bulk, tubular or bar according to actual needs.

In an optional embodiment, the medical devices comprise bone nails, bone plates, stent, etc., for example used as an orthopedic implant, an intracardiac intervention stent or a vascular intervention stent The technical effects obtained by present application comprise as follows: In the preparation of biodegradable magnesium alloy, by controlling the regulation of its morphology, the present application uses a-Mg as the main components and mixes Zn, Zr and Mn in a specific proportion to prepare an alloy with controllable morphology. The degradation rate is controllable and sufficient mechanical strength is ensured, and there is no rare earth element harmful to human body, and its degradation in the human body will not affect human body.

The present application preheats the alloy obtained by casting to modify the precipitated inhomogeneous inclusions to achieve the effect of eliminating the diffusion of the segregated and aggregated precipitates and reducing the area of the precipitates, so as to eliminate the obstacles for the subsequent reconstruction of microstructure and structure. At the same time, the subsequent processing process of the present application refines the grain and repairs the crack of the magnesium alloy surface film, and improves the strength and corrosion resistance properties.

In the present application, the addition of Zn can improve the strength and elongation of magnesium alloy. If Zn is too little, the present application cannot obtain the desired effect, and if it is too much, and exceeds the limit, which will form Zn-rich precipitates and reduce the corrosion resistance. In the present application, Ca maintains the strength of magnesium alloy and improves the effect of corrosion resistance. If Ca is too little, the present application cannot obtain the desired effect, and if it is too much, which will easily form precipitates. In the present application, Mn has an effect on the refinement of the alloy and the improvement of corrosion resistance. If Mn is too little, the present application cannot obtain the desired effect, and if it is too much, which will easily affect the machinability. In the present application, a small amount of Zr, Sn and Sr can be added to refine the grain of the magnesium alloy and improve its strength and plasticity.

DETAILED DESCRIPTION

Figure 1:
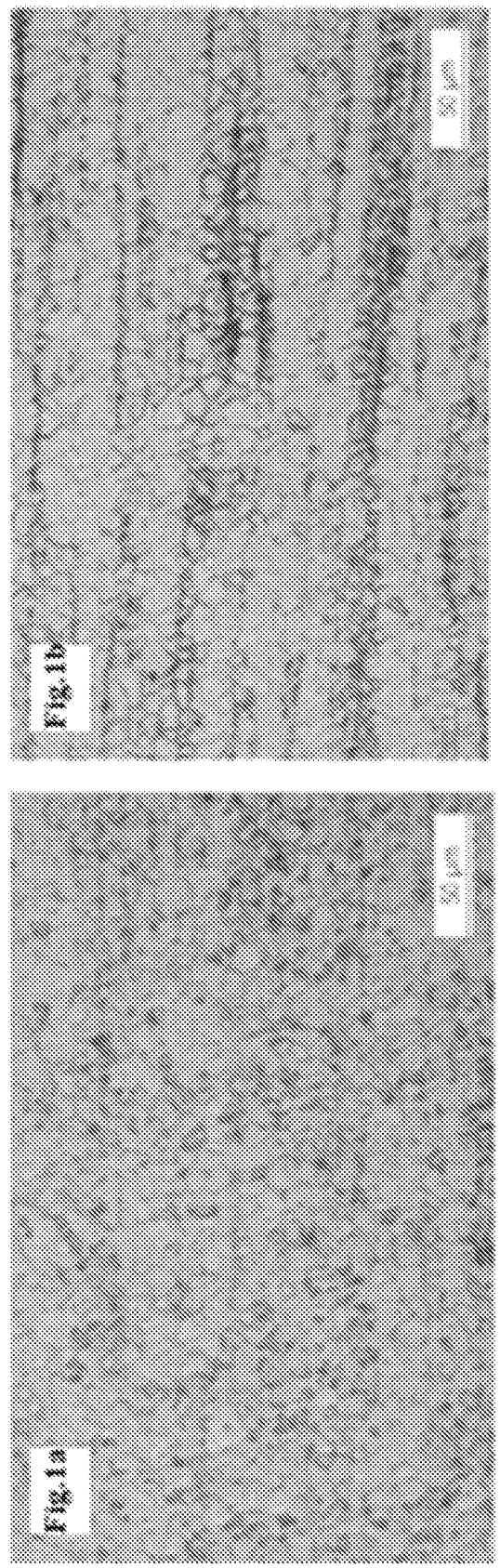
FIG. 1 is the microstructure comparison diagrams of the cross sections of the samples of example 1 and comparative example 1 according to the present application.

The embodiments of the present application are described in detail below, the examples of which are shown in the drawings, wherein the same or similar reference numbers represent the same or similar modules or modules having the same or similar functions throughout. The embodiments described below with reference to the attached drawings are illustrative and are only used to explain the present application and should not be construed as limiting the present invention.

In the description of the present invention, description with reference to terms "one embodiment", "another embodiment", etc., means that a specific feature, structure, material or characteristic described in combination with that embodiment that are included in at least one embodiment of present application. In the description, the schematic representation of the above terms does not have to refer to the same embodiment or example. Moreover, the described specific features, structures, materials, or features may be combined in a suitable manner in any one or more embodiments or examples. In addition, the technical features involved in different embodiments or examples of the present invention described in the description can be combined with each other as long as they do not constitute a conflict between them.

The magnesium alloy used in the orthopedic implants of the present application is based on Mg as main phase, mixed with other alloy elements, and does not contain rare earth elements. Generally, magnesium alloys for such orthopedic implants require a certain strength and degradation rate. In terms of strength, the tensile strength and yield strength of the magnesium alloy obtained by the present application are both over 250 MPa; in terms of degradation rate, the degradable magnesium alloy in the present application has a degradation rate of 0.5-1.5 mm/year in simulated body fluid. Compared with the conventional magnesium alloy in the prior art, the magnesium alloys for orthopedic implants in the following embodiments of the present application have significant corrosion resistance, and especially have obvious inhibitory effect on the formation of pitting corrosion. The regulation of the corrosion rate is the main contribution of the proposed magnesium alloy of the present application to the prior art, because when the magnesium alloy is implanted into the organism, it is necessary to ensure that the implant has sufficient strength without being lost by large area corrosion for a period of time, and optionally does not affect the healing process of the organism itself. In addition, the magnesium alloy in the present application shows excellent strength.

In terms of morphology, the embodiments of the present application can obtain degradable magnesium alloy, and control that there are no large area, irregular columnar or strip grains or obvious grain structure with obvious length-diameter ratio. Optionally, equiaxial fine grains with uniform grain size distribution and relatively dense surface layer structure distribution are obtained. These morphological characteristics, in particular, make it particularly advantageous to use the magnesium alloys of the present application as alloy materials, for example, for biodegradable orthopedic implants.

The biodegradable magnesium alloy obtained in the present application can be widely used as an orthopedic implant, an intracardiac intervention stent or a vascular intervention stent, and widely used (or used after molding and processing) as nails, screws, suturing nails, fixation plates, bending rods, joint bolts, locking bolts, intraspinal stents, honeycomb supports, etc. in vivo, which satisfy the needs of organisms.

Some specific experimental steps or conditions not indicated in the examples can be carried out according to the operation or conditions of conventional experimental steps described in the literature in this field.

The powder purity of metal raw materials used in the following examples and comparative example is not less than 99.999%. The manufacturer of the reagents or instruments used are not indicated, which are all commercially available conventional reagent products.

Example 1

The present example provides a biodegradable magnesium alloy without rare earth elements, the preparation method comprises the following steps of: 91 parts of Mg, 4 parts of Zn, 1 part of Ca, 1 part of Mn, 0.8 parts of Zr, 2 parts of Sn and 0.2 parts of Sr metal powder are mixed well before casting, and then cast at 700° C.; heat treatment: the casting alloy is heated, the temperature is controlled at 200° C., annealed for 1 min, and cooled; hot extrusion: the heat-treated alloy is put into the hot extrusion mold, the temperature is controlled at 300° C., the extrusion rate is controlled at 5 mm/s, and the extrusion ratio is set to 10:1; Rolling and forming: rolling is carried out at 350° C., the speed is controlled at 30 m/min, the reduction of each rolling is controlled at 60%, and passes for the rolling are no more than 10 times to obtain a formed biodegradable magnesium alloy.

Example 2

The present example provides a biodegradable magnesium alloy without rare earth elements, the preparation method comprises the following steps of: 89.2 parts of Mg, 5 parts of Zn, 1 part of Ca, 1 part of Mn, 0.8 parts of Zr, 2 parts of Sn and 1 parts of Sr metal powder are mixed well before casting, and then cast at 750° C.; heat treatment: the casting alloy is heated, the temperature is controlled at 250° C., annealed for 2 min, and cooled; hot extrusion: the heat-treated alloy is put into the hot extrusion mold, the temperature is controlled at 300° C., the extrusion rate of is controlled at 5 mm/s, and the extrusion ratio is set to 15:1; Rolling and forming: rolling is carried out at 350° C., the speed is controlled at 20 m/min, the reduction of each rolling is controlled at 50%, and passes for the rolling are no more than 10 times to obtain a formed biodegradable magnesium alloy.

Example 3

The present example provides a biodegradable magnesium alloy without rare earth elements, the preparation method comprises the following steps of: 90 parts of Mg, 5 parts of Zn, 1 part of Ca, 1 part of Mn, 0.8 parts of Zr, 1.2 parts of Sn and 1 parts of Sr metal powder are mixed well before casting, and then cast at 700° C.; heat treatment: the casting alloy is heated, the temperature is controlled at 200° C., annealed for 1 min, and cooled; hot extrusion: the heat-treated alloy is put into the hot extrusion mold, the temperature is controlled at 250° C., the extrusion rate of is controlled at 5 mm/s, and the extrusion ratio is set to 15:1; Rolling and forming: rolling is carried out at 320° C., the speed is controlled at 30 m/min, the reduction of each rolling is controlled at 80%, and passes for the rolling are no more than 10 times to obtain a formed biodegradable magnesium alloy.

Comparative Example 1

Except for the heat treatment in step 2), other parameters and processes in this comparative example are the same as those in example 1.

Alloy Microstructure Morphology Test

The magnesium alloys obtained from example 1 and the comparative example 1 were taken for sample preparation, and the microstructure was observed and compared. The microstructure comparison of the cross section of the sample of example 1 and the comparative example 1 of the present application is shown in FIG. 1. It can be clearly seen that compared with the sample of the comparative example 1, the grain size of the magnesium alloy sample obtained by the present application method is more uniform, indicating that the recrystallization of the structure in the process is more complete; at the same time, the grains are finer and the segregation phase is less, indicating that the preheating treatment reduces the precipitate and reduces the resistance of the grain to re-refined crystallization.

Figure 2:
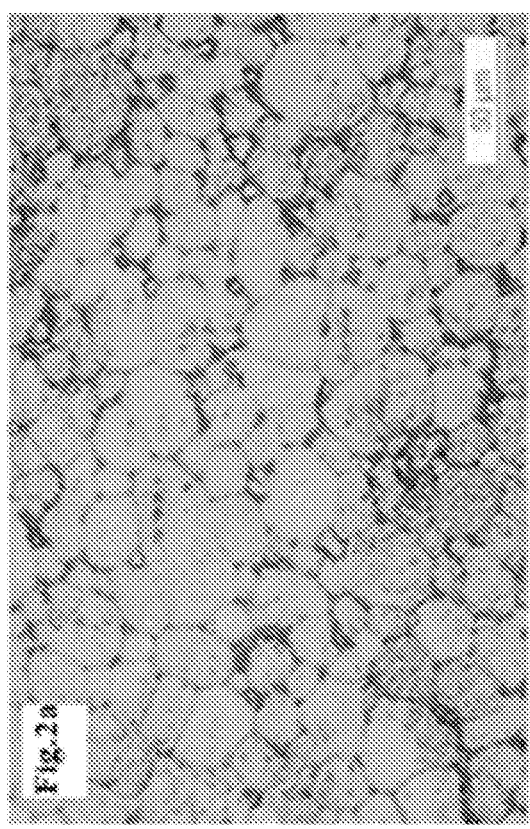
FIG. 2 is the microstructure morphology comparison diagrams of the surface of the samples of example 1 and comparative example 1 according to the present application.
Figure 2:
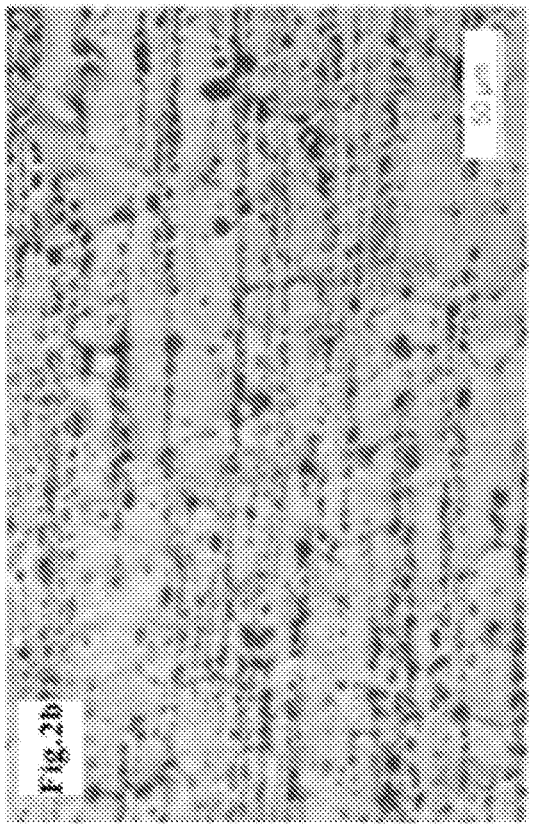

The microstructure morphology comparison of the surface of the sample of example 1 and the comparative example 1 of the present application is shown in FIG. 2. It can be seen from the comparison that the cracks on the surface of the magnesium alloy sample obtained by the method of the present application are obviously suppressed, and the width, length and density of the cracks are significantly reduced. The crack density of the surface film in the present application is lower than 20 microcracks/mm$^2$, while the crack density of the surface film of the sample of the comparative example 1 is higher than 100 microcracks/mm$^2$.

Alloy Strength Property Test

The tensile strength, yield strength and elongation of the biodegradable magnesium alloy obtained from examples 1-3 and the comparative example 1 are measured according to GB-T228-2002, and the strength index is tested. The test results are shown in Table 1 and FIG. 3:

TABLE 1

| Sample | Tensile strength MPa | Yield strength MPa | Elongation |
|---|---|---|---|
| Example 1 | 330 | 300 | 21 |
| Example 2 | 330 | 280 | 21 |
| Example 3 | 300 | 255 | 21 |
| Comparative example 1 | 255 | 225 | 17 |

Figure 3:
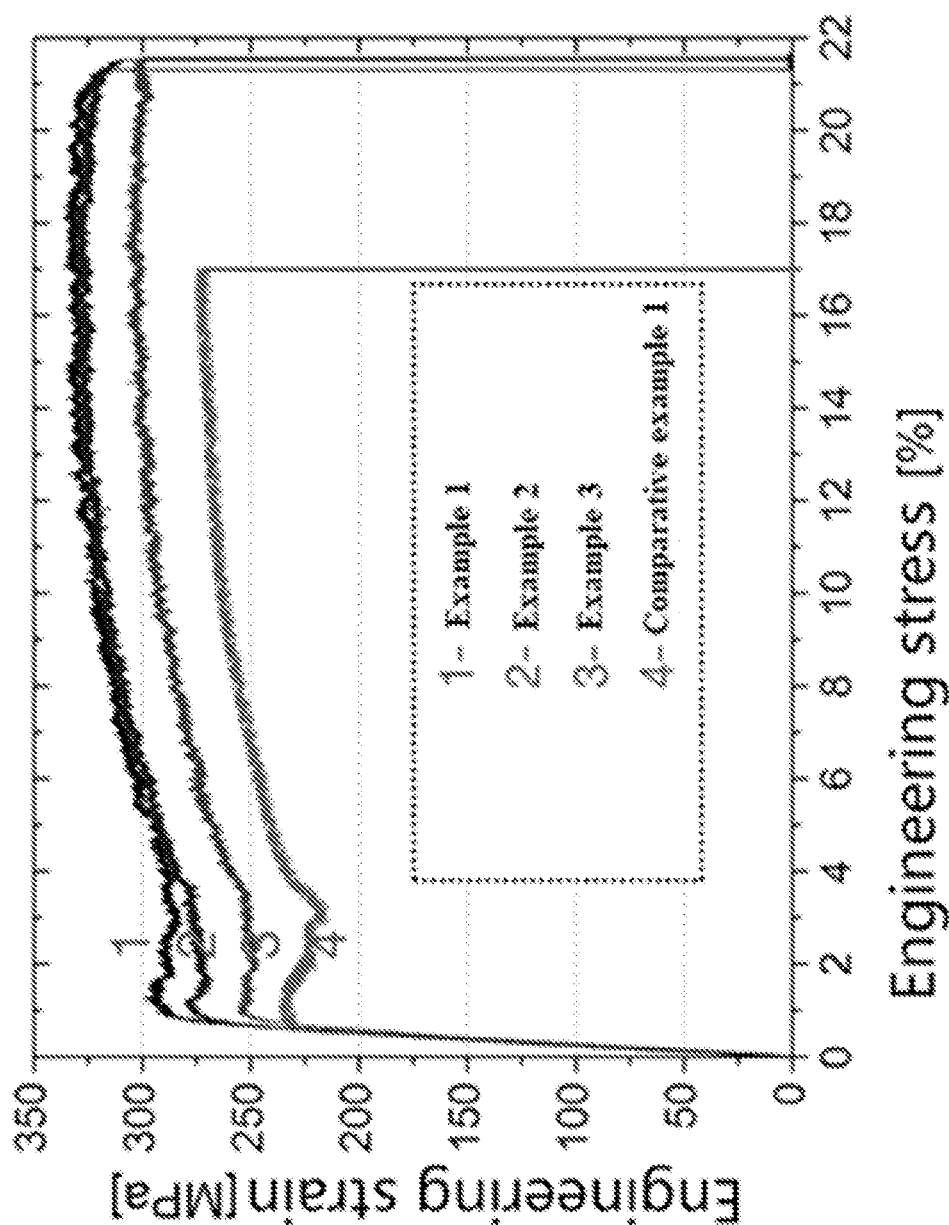
FIG. 3 is the tensile-strain curve comparison diagram of the samples of examples 1-3 and comparative example 1.

It can be intuitively shown from the tensile-strain curves in FIG. 3 that the yield strength of the magnesium alloy obtained from Examples 1-3 is greater than 250 MPa, the tensile strength is greater than 275 MPa, and the elongation is greater than 20%. The yield strength and tensile strength of the magnesium alloy sample of the comparative example 1 are lower than 225 MPa and 260 MPa, and the elongation is lower than 17%. Therefore, compared with the sample of the comparative example, the strength performance of the sample in the present application has been improved by at least 10-20% or more.

Alloy Degradability

The biodegradable magnesium alloy obtained in Examples 1-3 and the comparative example 1 is made into bars. Each bar has a thickness of 1 mm and a diameter of 10 mm and is immersed in 37% physiological saline to simulate the degradation by body fluids in the human body. The simulation test results are shown in the table below:

TABLE 2

| Sample | Example 1 | Example 2 | Example 3 | Comparative example 1 |
|---|---|---|---|---|
| Degradation rate mm/Y | 0.89 | 1.17 | 1.35 | 1.91 |

It can be seen from the above table that the biodegradable magnesium alloys obtained by the examples of the present application have a good control of degradation rate in the simulated body fluid, and can provide strength for a certain time while meeting the healing time of the organism's own tissue. However, the rapid and uncontrollable degradation rate of the comparative example 1 is unfavorable for the control of precipitates after degradation and the maintenance of implant strength.

Obviously, the above-mentioned embodiments are merely examples made for clear description, but do not limit the implementation. For those of ordinary skill in the art, other different forms of variations or modifications can also be made on the basis of the above-mentioned description. All embodiments are not necessary to be and cannot be exhaustively listed herein. In addition, the obvious variations or modifications derived therefrom all fall within the scope of protection of the present invention.

We claim:

1. A method for preparing a biodegradable magnesium alloy without rare earth elements, wherein the biodegradable magnesium alloy without rare earth elements comprises the following elements in percentage by mass:

| | |
|---|---|
| Zn | 1.0-5.0%; |
| Mn | 0.1-1.0%; |
| Ca | 0.1-1.0%; |
| Sr | 0.1-1.0%; |
| Sn | 0.1-3.0%; |
| Zr | 0.1-0.8%; and |
| Mg | balance[[;]], | wherein, the magnesium alloy has an average grain size of 5-10 μm, and an average density of crack distribution on the surface of the magnesium alloy is less than or equal to 20 cracks/mm$^2$, the method specifically comprising the steps of:
1) melting-casting: in a closed container, fully adding each metal powder into a melting ladle according to the required proportion, controlling the temperature to melt at 700-800° C., blowing argon and stirring, casting and cooling;
2) heat treatment: heating the alloy obtained by casting, controlling the temperature at 200-250° C., annealing for 1-5 min, and cooling;
3) hot extrusion: putting the heat-treated alloy into a hot extrusion mold, controlling the temperature at 250-300° C., controlling the extrusion rate at 2-5 mm/s, and setting the extrusion ratio to 10-15:1; and
4) rolling and forming: rolling at a temperature of 320-350° C., controlling the speed at 20-30 m/min, and controlling the reduction of each rolling at 50-80%, to obtain a formed biodegradable magnesium alloy, and the magnesium alloy has a tensile strength and a yield strength greater than 250 MPa, which are measured according to GB-T228-2002, the magnesium alloy has a degradation rate of 1.35 mm/Y or less.

2. The method for preparing a biodegradable magnesium alloy without rare earth elements of claim 1, wherein, after the rolling is completed, a further heat treatment process can be carried out according to requirements.

3. The method for preparing a biodegradable magnesium alloy without rare earth elements of claim 1, wherein, preheating is carried out before rolling, and the preheating time does not exceed 10 minutes.

4. The method for preparing a biodegradable magnesium alloy without rare earth elements of claim 1, wherein passes for the rolling are no more than 10 times.

5. The method for preparing a biodegradable magnesium alloy without rare earth elements of claim 1, wherein, in an optional embodiment, during the melting-casting, the blowing argon and stirring is blowing argon gas through a gas port at the bottom of the melting ladle.

* * * * *